Figure 1:
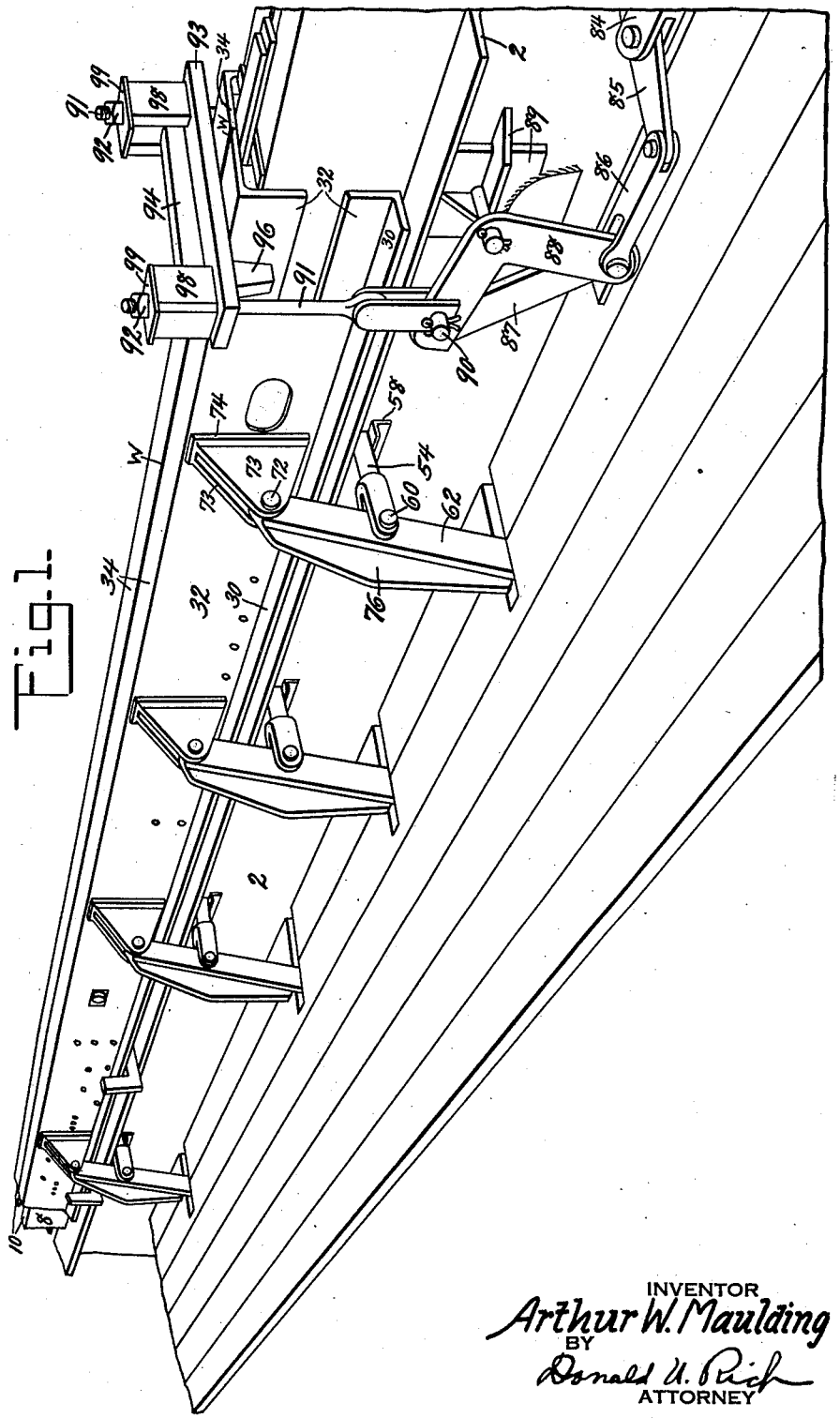

Nov. 20, 1945. A. W. MAULDING 2,389,526
CENTER SILL JIG
Filed Aug. 19, 1942 2 Sheets-Sheet 1

INVENTOR
Arthur W. Maulding
BY
Donald U. Rich
ATTORNEY

Nov. 20, 1945.  A. W. MAULDING  2,389,526
CENTER SILL JIG
Filed Aug. 19, 1942  2 Sheets-Sheet 2
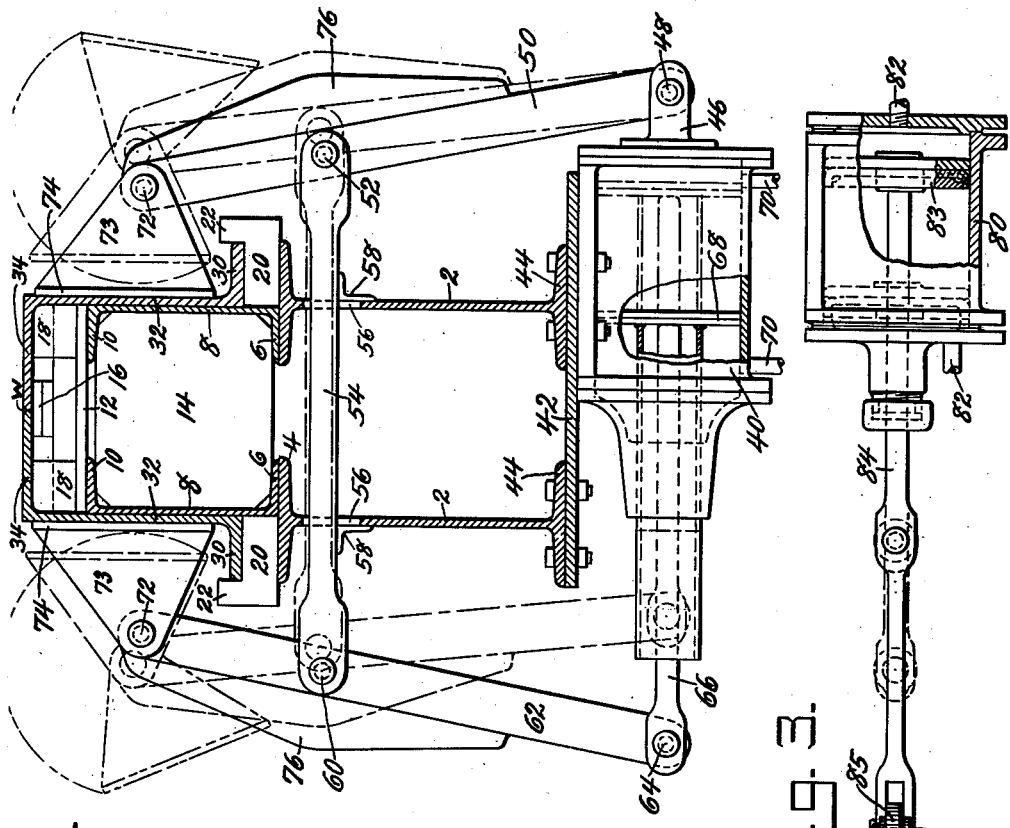
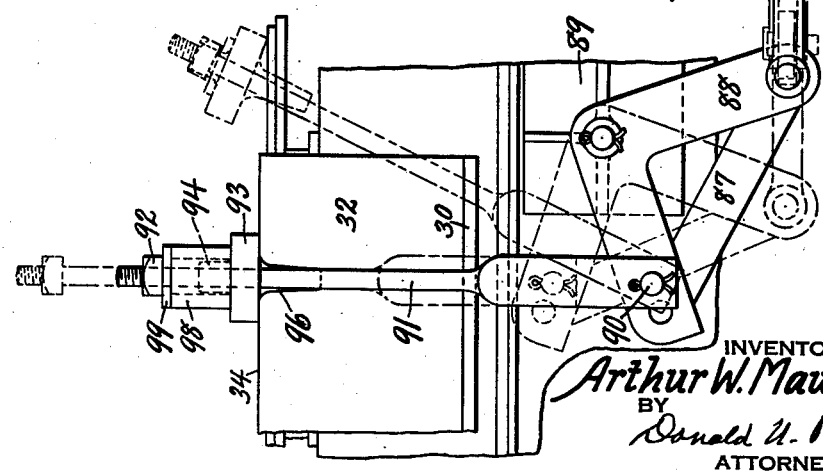
INVENTOR
Arthur W. Maulding
BY
Donald U. Rich
ATTORNEY Patented Nov. 20, 1945

2,389,526

UNITED STATES PATENT OFFICE 2,389,526

CENTER SILL JIG

Arthur W. Maulding, Chicago, Ill., assignor to American Car and Foundry Company, New York, N. Y., a corporation of New Jersey Application August 19, 1942, Serial No. 455,303

5 Claims. (Cl. 113—99)

This invention relates to a center sill jig adapted to hold the component parts of the center sill firmly in place during the welding operation.

During welding of the Z section elements together to form a flanged channel center sill it has been necessary in the past to use a large number of clamps, wedges, etc. The clamps and wedges in spite of careful application would exert unequal pressures on the sill elements causing a distortion of the sill, also the clamps and wedges were in the road of the welder thereby preventing rapid welding of the sill elements. It is an object, therefore, of the present invention to provide a center sill welding jig which will hold the component parts of the center sill firmly in place while leaving the seam to be welded substantially unobstructed.

A further object of the invention is the provision of a center sill welding jig having a plurality of power actuated clamping devices for holding the sill elements firmly in position for welding.

A still further object of the invention is the provision of a center sill welding jig with the parts so constructed and arranged as to eliminate manual labor as much as possible thereby speeding up the operations of preparation and removal of the sill from the jig.

These and other objects of the invention will be apparent to persons skilled in the art from a study of the following description and accompanying drawings, in which Fig. 1 is a perspective view of substantially one-half the improved jig;

Fig. 2 is a sectional view taken through the jig adjacent one of the side clamps, and Fig. 3 is a side view of the yoke or end clamp.

Referring now to the drawings in detail, it will be seen that the jig is built up of a pair of spaced I-beams 2 disposed with the web extending vertical and having the top flanges disposed substantially horizontal. The inwardly extending top flanges 4 provide a support for lower flanges 6 of channels 8. These channels have their flanges directed inwardly toward each other and the bottom flanges and lower edge of the web are welded or otherwise secured to the top flanges of the main supporting members 2. The webs of channels 8 are disposed apart the exact distance which is required between the webs of the finished center sill. The inwardly directed top flanges 10 of channels 8 are tied together at intervals by angles 12 welded or otherwise secured to the flanges. Also the channels 8 are tied together by plates 14 disposed at right angles to the channel webs and welded thereto as well as to the channel flanges. These plates 14 will stiffen and prevent any movement of the channels 8 relative to each other under action of the clamping devices later to be described. Attached to the top edges of the angles 12 are straps or bars 16, the uppermost of which is preferably made of copper in order to provide a back-up for weld metal and also a good conductor for the return welding current. At suitable points adjacent the center of the jig upper shims 18 are placed and supported by the angles 12 immediately above the channels 8. These shims in addition to bottom shims 20 may be changed in order to change the camber which must be placed in the center sill during its welding. The bottom shim elements 20 are formed with upstanding legs 22 adapted to serve as guides for the bottom flanges of the center sills. It is obvious that by changing the thickness of shims 18 and 20 the various degrees of camber may be placed in the center sill.

The center sill is of standard construction being formed of Z section elements having short bottom flanges 30, web 32 and long top flanges 34 which are adapted to be welded together as at W, thereby forming a flanged channel center sill. In order to hold the Z sections in proper position against channels 8 a plurality of clamping devices for the sides of the sill are necessary. Each of these, as clearly shown in Fig. 2, consists of a cylinder 40 carried by a plate 42 attached to the bottom flanges 44 of the I-beams 2. The cylinders as shown are of slightly modified brake cylinder design with a fulcrum lug 46 formed on the head and adapted to receive a pin 48. Upon this pin is pivotally mounted a lever 50 pierced intermediate its length to receive a pin 52 which extends through the jaws of an equalizing rod 54. This rod extends through openings 56 in the webs of I-beams 2 and is given added bearing for sliding motion by short angle brackets 58. The ends of the equalizer rod opposite from pin 52 is connected by a pin 60 to an intermediate portion of lever 62, the lower end of which is connected by pin 64 to the piston rod 66 which is reciprocable in the cylinder under action of piston 68. Motive power is supplied to the cylinder on either side of the piston by means of conduits 70. The upper ends of levers 50 and 62 are pierced to receive pins 72 which extend through spaced plates 73 of a clamping head. The spaced plates 73 are welded or otherwise secured together by flat plates 74 of a length substantially equal to the depth of the web 32 of the center sill. These pressure or clamping heads may be swung around the pivot pins 72 from an operative to an inoperative position. The levers 50 and 62 are stiffened at the points of maximum strains by plates 76 welded or otherwise secured in position and as clearly shown in Figs. 1 and 2.

In order to pull the ends of the center sills downwardly to provide the necessary camber the yokes or end clamps shown in Figs. 1 and 3 are provided. Each of these end clamp arrangements consists of a cylinder 80 fed by motive power through conduits 82 entering the cylinder on either side of the piston 83. This piston is connected to a piston rod 84 which in turn is pin connected to an equalizing bar 85. The ends of the equalizing bar are connected by pull links 86 to the lower ends of bell-cranks 88. The bell-cranks are located on the outer side of the I-beams 2 and are pivotally connected thereto by brackets 89 fastened to the webs of the I-beams and of sufficient width to bring the pivotal mount for the bell-crank outwardly of the I-beam flanges. The free ends of the bell-cranks are pin connected as at 90 to the lower ends of rods 91, the upper ends of which are threaded to receive nuts 92. The rods 91 located on opposite sides of the I-beams and channels are connected together by a yoke formed of a flat plate 93 braced by plate 94, thus forming a substantial T-section. Lugs 96 are attached to the under side of plates 93 and are adapted to engage the outer sides of the center sill webs and since their inner faces are beveled will exert a clamping action on the center sills forcing the flanges 34 into tight contact with each other at the ends of the sills. The bell-cranks are reinforced, as clearly shown, by means of a strap 87 extending across the legs of the bell-crank and preventing spreading of the elements. In order to speed up the removal of the yokes or end clamps from the center sill U-shaped spacers 98 are provided adapted to slide between the plate 93 of the yoke and washer 99.

A center sill is clamped in the jig as follows: When the jig is empty the pistons of all operating cylinders will be in the position shown by line and dash in Figs. 2 and 3 and the yokes and side clamps will be in the position shown by line and double dash of Figs. 2 and 3. With the parts in these positions the Z section elements, which are to form the center sill, will be lowered into position on the supporting portion of the jig with the center part of the sill elements resting on shims 18 and 20 which have been preselected to give the proper camber to the sills. An attendant then makes a complete circuit of the jig throwing the side clamps from the line and double dash position of Fig. 2 to the line and single dash position in which they are substantially parallel to but spaced from the webs of the center sill forming elements. Also the yokes or end clamps are moved from the line and double dash position of Fig. 3 to the line and single dash position and the spacers 98 inserted, thus taking up the necessary slack without the slow operation of turning the nuts 92 on the rods. As soon as the parts are in the line and single dash position the operator admits air or other motive fluid under pressure to cylinders 80 through conduits 82. This immediately causes the piston rods to move and cause the bell-cranks to rotate pulling rods 91 downwardly and forcing the lugs 96 along the side of the center sill forming elements and bringing plates 93 of the yoke into engagement with the top flanges 34 of the center sill. After the pistons 83 have nearly completed their travel the center sill elements will have their ends pulled downwardly thereby placing a curve or camber in the center sills which are supported adjacent the centers by shims 18 and 20. The operator then admits air or other motive fluid to the cylinders 40 through conduits 70 and simultaneously causing movement of the various piston rods 66. Outward movement of the piston rods 66 causes the levers 62 to rotate until the clamps at the upper ends engage the side sill webs. Continued rotation of the levers will then cause equalizer rods 54 to impart a rotation to levers 50 pulling the clamping heads carried at their upper ends into tight engagement with the center sill element, thus it will be seen that admission of fluid under pressure to cylinders 40 will cause all of the side clamping heads to grip the webs of the center sill forming elements and force them tightly against the webs of channels 8. The source of fluid pressure is kept acting on the pistons of 40 and 80, thereby at all times exerting a constant yet yielding pressure on the center sill forming elements. In other words, when the center sill elements are clamped ready for welding they are held by a pressure sufficiently great to hold them in proper position yet of such a nature that excessive distortion at any single point in the sill may be accommodated without deforming some other point as has in the past occurred with unyieldable metallic clamps. With the clamps firmly gripping the center sill elements, the welding W is applied and the elements combined to form the center sill. Such welding operation is unobstructed except by the yokes at the ends of the sill elements and the slight gap beneath these yokes may be readily welded after removal of the yokes at the end of the operation. A reverse operation of that just described will release the clamping elements from the center sill and it may be removed from the supports. It will be obvious that no part of the sill can be subjected to a different clamping pressure than any other part since the cylinders are all subject to the same pressure and since the various levers and pull rods are equalized by suitable equalizers such as 54 and 85. In other words, the multiple groups of cylinders 40 and 80, together with their various connected levers, pressure heads, and equalizer rods or bars, constitute equalizing devices exerting substantially constant and equal pressure for each group on the center sill. It will also be obvious that during expansion and contraction of the sill while being welded the same pressure will be maintained due to the resilient nature of the pressure applying medium thereby preventing distortion.

While the jig has been described more or less in detail with specific reference to the figures, it is obvious that various modifications and rearrangements of parts may be made and all such modifications and rearrangements of parts are contemplated as will fall within the scope of the appended claims defining my invention.

What is claimed is:

1. The combination in a jig for assembling center sills, of a support structure adapted to receive Z-shaped center sill parts, yokes extending across and engaging the ends of the top flanges of the Z-shaped parts, bell cranks pivotally carried by said support structure and being pivotally connected to said yokes whereby said yokes may swing longitudinally of the support structure into and out of engagement with the center sill parts, equalizers pivotally connected to said bell cranks thereby insuring transmission of equal pressure to the bell cranks and yokes, and fluid actuating means connected to said equalizers to operate the bell cranks thereby causing the same to move the yokes and pull the sill parts down onto the said support structure.

2. The combination in a jig for assembling center sills, of a support structure to receive Z-shape center sill parts, bell cranks pivotally carried by said support structure, yokes pivotally connected to said bell cranks and extending across and engaging the ends of the top flanges of the Z-shaped center sill parts, said yokes being bodily swingable longitudinally of the center sill parts to clear the same for removal of the center sills from the support structure and fluid pressure means connected to said bell cranks to operate the same thereby pulling said sill parts down onto said support structure.

3. The combination in a jig for assembling center sills made up of two longitudinal parts, a support structure to receive the two center sill parts, a plurality of pairs of opposed pressure heads engageable with the outer surfaces of the sill parts to hold the same on the support structure, pairs of opposed levers with each lever pivotally connected adjacent one end to a pressure head, equalizing means pivotally connecting each pair of opposed levers intermediate their ends, means for pivotally connecting the opposite end of one of each pair of levers to a fixed member, the opposite end of the other lever of each pair being pivotally connected to power actuated means, said power means and equalizer actuating said pairs of levers in unison to thereby force said pressure heads with equal pressure into flat engagement with the outer surface of said sill parts.

4. The combination in a jig for assembling center sills made up of two Z-shape parts, of a rigid support structure adapted to receive the two Z-shaped center sill parts, a plurality of fluid pressure devices carried by said support structure, a plurality of levers pivotally connected in pairs to said fluid pressure devices for relative lateral movement and extending upwardly with the levers of each pair located on opposite sides of the support structure, said levers being otherwise free of connection with said support structure, a plurality of pressure heads pivotally connected to said levers adjacent the upper ends thereof and adapted to engage the outer sides of the webs of said Z-shaped center sill parts, and an equalizer means connecting the levers of each pair together intermediate the pivotal connection of said levers to said pressure heads and fluid pressure devices whereby said pressure heads will move flatwise against the outer sides of the web of the center sill parts and with equal pressure.

5. The combination in a jig for assembling center sills made up of at least two component parts, of a support structure to receive the component parts of the center sills, a fluid pressure device carried by the support structure and extending transversely thereof, a lever pivotally connected to said fluid pressure device adjacent each end thereof for operation thereby and extending upwardly along the adjacent side of the support structure, a pressure head pivotally connected to the upper ends of each lever and adapted to bear flatwise against the outer surface of the component center sill parts to hold the same on said support structure, and an equalizer means pivotally connected to said levers intermediate their ends whereby pressure will be divided equally between said pressure heads upon actuation of said fluid pressure device.

ARTHUR W. MAULDING.